United States Patent [19]

Lhospice

[11] 4,371,238

[45] Feb. 1, 1983

[54] SPECTACLES FRAME

[75] Inventor: Bernard Lhospice, Blois, France

[73] Assignee: Essilor International Cie Generale d'Optique, Cretail, France

[21] Appl. No.: 197,707

[22] Filed: Oct. 16, 1980

[30] Foreign Application Priority Data

Oct. 16, 1979 [FR] France ............................ 79 25654
Aug. 22, 1980 [FR] France ............................ 80 18335

[51] Int. Cl.³ .............................................. G02C 1/04
[52] U.S. Cl. ..................................... 351/106; 351/133
[58] Field of Search ..................... 351/86, 92, 95, 106, 351/133; 2/443, 441

[56] References Cited

U.S. PATENT DOCUMENTS 2,851,925  9/1958  Cretin-Maitenaz ..................... 88/47

FOREIGN PATENT DOCUMENTS 1094381  5/1955  France .
73293  9/1960  France .
533161  2/1941  United Kingdom .
755746  8/1956  United Kingdom ................ 351/106

Primary Examiner—John K. Corbin
Assistant Examiner—Rodney B. Bovernick
Attorney, Agent, or Firm—Charles A. Brown

[57] ABSTRACT

The invention relates to a spectacle frame of the kind comprising a main structure (10) and, for each lens (11) to be mounted, a surround which is formed, on the one hand, from an upper rim (12), and, on the other hand, from a flexible rim cord (13).

According to the invention, for at least one of the ends of the said flexible rim cord, four holes are provided in combination, two holes (14) being formed in the main structure (10), and two holes (26) being formed in correspondence in the upper rim (12), so that the said rim cord (13) fastens this upper rim (12) to the main structure (10).

18 Claims, 23 Drawing Figures

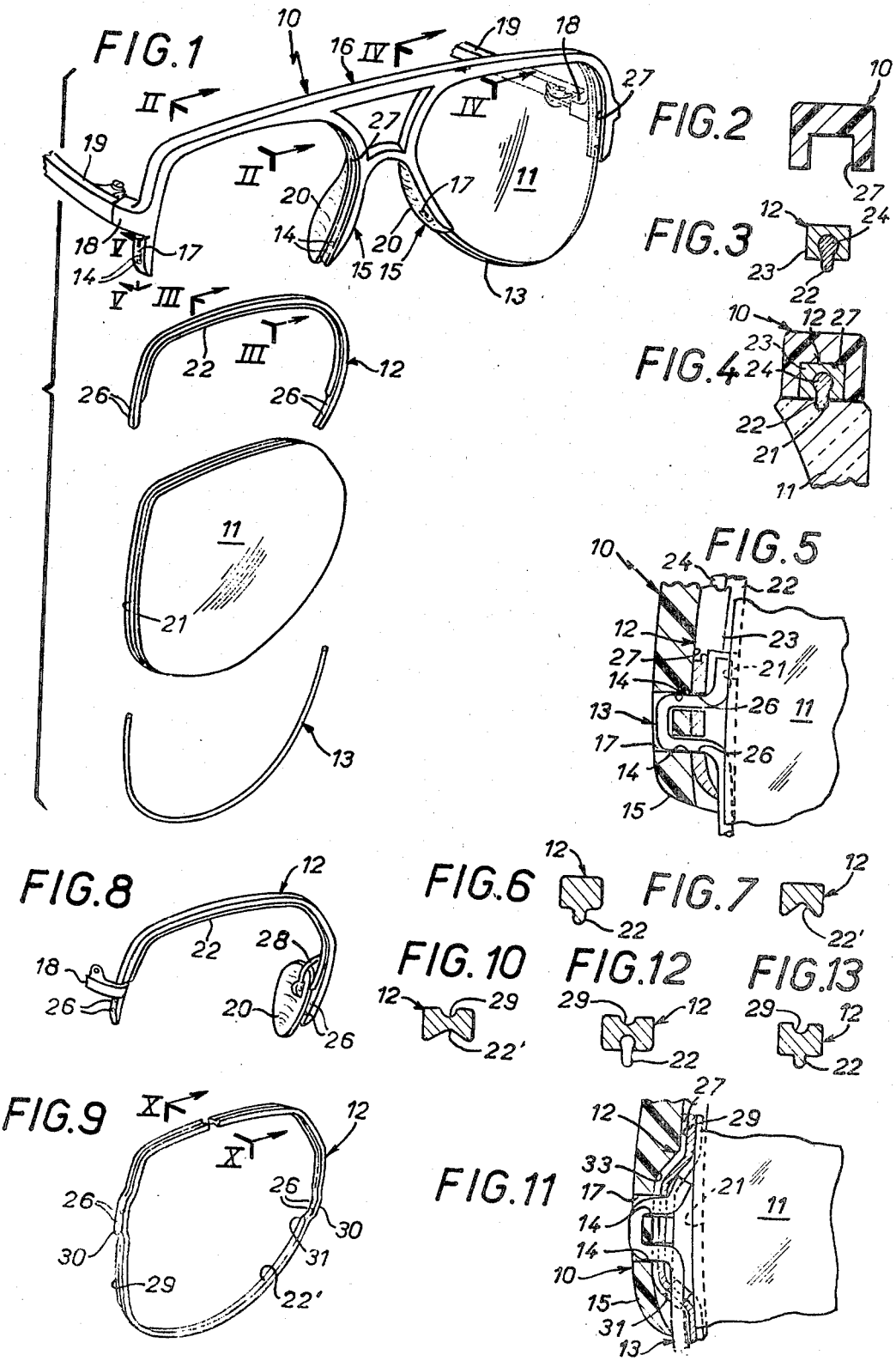

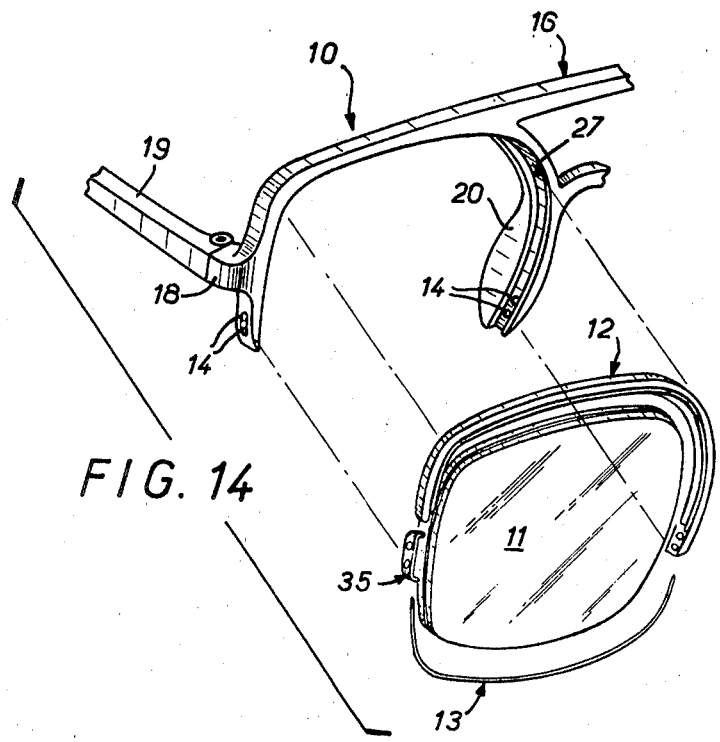
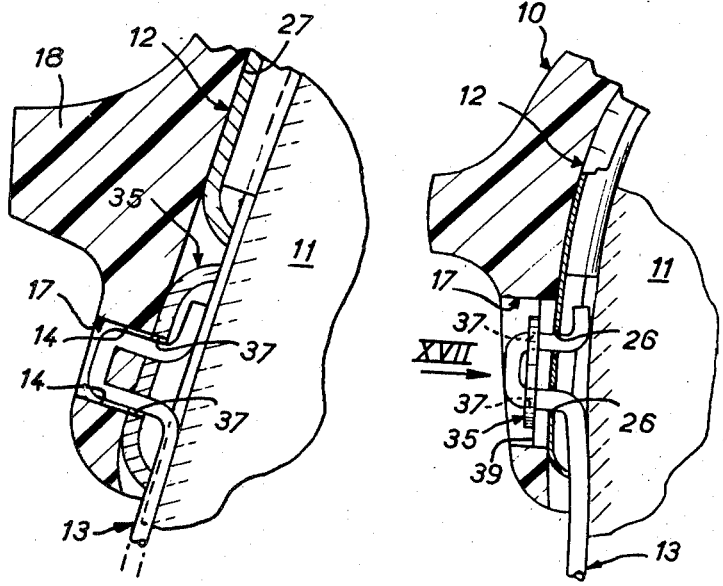

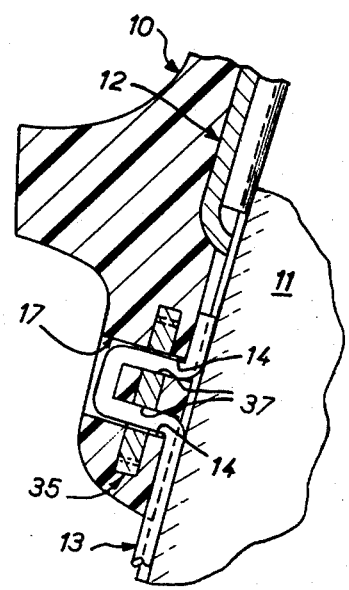
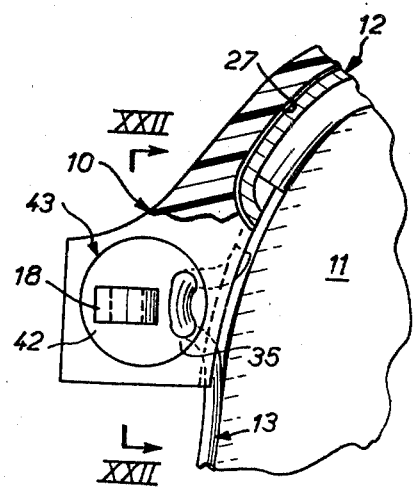
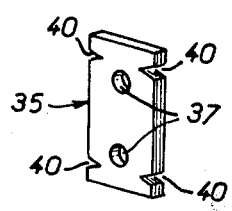
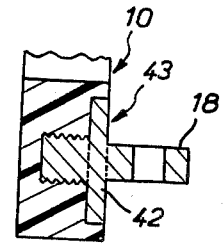
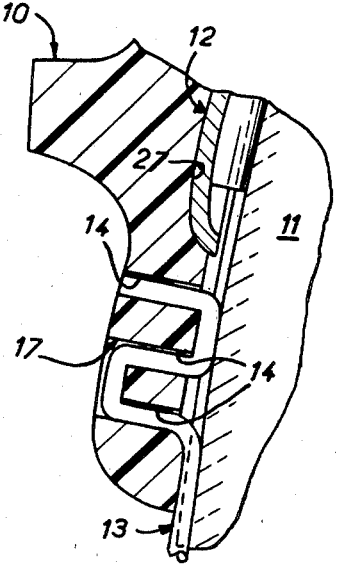

SPECTACLES FRAME

The present invention relates in general terms to spectacle frames of the kind comprising a main structure and, carried by the latter, two surrounds or rims which are each suitable for receiving a spectacle lens, and relates more precisely to those spectacle frames of the type in which each of the said surrounds comprises, on the one hand, a relatively rigid upper rim, which extends over at least part of the periphery of the spectacle lens in question, and, on the other hand, a relatively flexible rim cord, which holds the said lens.

Spectacle frames of this type are described, in particular, in British Pat. No. 533,161 and also in French Pat. No. 1,094,381 and the various additions attached to the latter.

They have the advantage of being very light, this lightness being due to the participation of a flexible cord in the formation of each rim or surround, it being advantageously possible for the cross-section of this flexible cord to be relatively small.

According to the embodiments described in British Pat. No. 533,161, this flexible cord is permanently fastened to the main structure at each of its ends, and this makes it difficult to replace in the event of breakage.

On the other hand, in the embodiments described in French Pat. No. 1,094,381 and the additions attached thereto, each flexible rim cord is only fixed in a detachable manner, by wedging, to the main structure at each of its ends, by passing through two holes associated with this main structure.

In practice, the two holes in question are most frequently formed at the corresponding end of the associated upper rim, the main structure reducing to a simple central bar to which this upper rim is joined.

However, Addition No. 73/293 to this French Pat. No. 1,094,381 describes an embodiment according to which provision is made for a main structure which extends over the whole width of the spectacle frame in question, from one of the side pieces of the latter to the other, the holes suitable for the fixing of the flexible rim cords being directly formed in this main structure, whilst, for each rim or surround, an upper rim, which then simply forms an embellishment and extends over all or part of the contour of this rim or surround, is inserted, by wedging, between the spectacle lens in question and the main structure, no particular fastening, other than simple interlocking, being provided between this upper rim and this main structure.

Whatever the case may be, the use of flexible cords for holding the spectacle lenses, in practice, involves the choice of a relatively rigid material for forming the main structure and the upper rims carried by the latter, if these upper rims are permanently fastened to this main structure; otherwise, as a result of simple deformation of the assembly, it can happen that the spectacle lenses inadvertently fall out of their rims or surrounds.

It is for this reason that, hitherto, in the conventionally marketed spectacle frames with flexible rim cords of the kind in question, the main structure, and also the upper rims which it carries, are made of metal.

Although this arrangement has proved and continues to prove satisfactory, it results in a certain inflexibility as regards the possible overall configuration for the spectacle frames in question, and this does not make it possible flexibly to follow the demands of fashion in this area.

In particular, in the case of spectacle frames with flexible rim cords of the kind in question, it has not hitherto been possible easily to derive, in an economic manner, all the benefit which synthetic materials customarily offer for other types of spectacle frame, both as regards decoration and as regards manufacture.

Admittedly, the embodiment with embellishing upper rims, described in Addition No. 73/293 to the abovementioned French Pat. No. 1,094,381, already constitutes a step towards the production of a spectacle frame with flexible rim cords of a combined nature, that is to say associating synthetic material with metal, it easily being possible for these embellishing upper rims to be made of synthetic material.

However, in an embodiment of this type, the use of the synthetic material can only be limited, the main part of the spectacle frames in question still being made of metal.

Admittedly also, embodiments have been proposed, according to which the main structure of spectacle frames with flexible rim cords is made of synthetic material.

However, in these embodiments, apart from the fact that the flexible rim cords used are fixed at their ends to capstans, in order to place them under traction, this being expensive, it is necessary in practice, in order to obtain the essential rigidity, to provide the main structure, made of synthetic material, with an internal metal reinforcement, and this considerably increases the manufacturing costs whilst at the same time losing all the benefit of the convenience of processing by simple molding, which is customarily associated with synthetic materials.

Moreover, in embodiments of this type, no specific upper rim is envisaged, the spectacle lenses being held directly by the main structure by engagement of their edge in a groove in the latter, which in practice restricts the use of the embodiments of this type only to carrying spectacle lenses of constant thickness and hence only to carrying lenses for sunglasses.

The present invention relates in general terms to an arrangement which, in contrast, makes it possible, if desired, to use synthetic material economically and in a conventional manner to form the main structure of spectacle frames with flexible rim cords of the kind in question, suitable for any type of lens.

More precisely, it relates to a spectacle frame of the kind comprising a main structure and, carried by the latter, two surrounds or rims which are each suitable for receiving a spectacle lens, each of the said surrounds comprising, on the one hand, an upper rim suitable for cooperating, by interlocking, with a spectacle lens, and, on the other hand, a flexible rim cord suitable for being fixed to the main structure at each of its ends, by being passed through two holes associated with the said main structure, this spectacle frame being characterized in that, for at least one of the ends of the flexible rim cord, four holes are provided in combination, two being formed in the main structure, in a manner which is individually in itself known, and two being formed in the upper rim in question, also in a manner which is individually in itself known, the said holes being in corresponding pairs from the said main structure to the said upper rim, so that the said flexible rim cord fastens the upper rim to the main structure.

According to a first possible embodiment, this is the case at each end of the flexible rim cord.

According to other embodiments, this is only the case at one of the ends of the flexible rim cord, this being sufficient in practice for the desired fastening.

In the latter case, an anchoring plate is preferably provided at the other end of the flexible rim cord, which anchoring plate is separate from the upper rim and, with the flexible rim cord passing through it, cooperates with the main structure for the fixing of the said other end of the flexible rim cord.

As a modified embodiment, three holes are provided in the main structure for S-type passage of the flexible rim cord.

Whichever embodiment is adopted, in all cases, each upper rim is advantageously firmly fastened to the main structure which carries it, this guaranteeing the rigidity required for keeping the spectacle lens in question firmly in position, and this fastening of this upper rim to the main structure is advantageously and economically carried out by means of the associated flexible rim cord, this flexible rim cord thus by itself performing a dual function, namely, on the one hand, fastening the upper rim to the main structure, and, on the other hand, encircling the spectacle lens in question, or encircling the upper rim in the case where, in a manner which is in itself known, the latter completely surrounds this spectacle lens.

Preferably, this type of fastening of the upper rims to the main structure by means of the flexible rim cords is carried out in the workshop so that, when the spectacle lenses are inserted, the practitioner who is called upon to carry out this insertion finds the assembly easier to handle.

Furthermore, if desired, the upper rims used according to the invention can advantageously be made of metal, independently of the main structure, these upper rims only strengthening this main structure, from the outside, after the latter has been manufactured.

Thus, if desired, a main structure of this type can advantageously be made of synthetic material in its entirety, for example by molding, in accordance with the customary techniques in this field and with all the desired flexibility with regard to configuration.

Briefly, in this case, the spectacle frame according to the invention advantageously permits, for a relatively moderate overall price, an advantageous compromise between, on the one hand, the general flexibility made possible by producing its main structure from a simple non-reinforced synthetic material, and, on the other hand, the rigidity which is necessary for the firm holding of the spectacle lenses in question, and which is imparted locally to this structure made of synthetic material by the metal upper rims which are joined and fastened thereto, whilst remaining light in its entirety and allowing easy and simple positioning of spectacle lenses.

Finally, as a result of the use of upper rims which it involves, the spectacle frame according to the invention is suitable both for carrying lenses for sunglasses and for carrying corrective lenses.

The characteristics and advantages of the invention will moreover become apparent from the description which now follows, by way of example, with reference to the attached schematic drawings, in which:

FIG. 1 is a partial view in perspective, with a part exploded, of a spectacle frame according to the invention, with the lenses with which it is to be equipped;

FIGS. 2, 3, 4 and 5 are partial views in section of this spectacle frame, on a larger scale, respectively along the lines II—II, III—III, IV—IV and V—V in FIG. 1, it being assumed that the said frame is assembled in FIG. 5;

FIGS. 6 and 7 are similar views to that of FIG. 3 and each relate respectively to a modified embodiment;

FIG. 8 is a view in perspective of a modified embodiment of an upper rim capable of being used in the spectacle frame according to the invention;

FIG. 9 is a view in perspective of another modified embodiment of this upper rim;

FIG. 10 is a transverse view in section of this upper rim, on a larger scale, along the line X—X in FIG. 9;

FIG. 11 is a similar view to that of FIG. 5, for the upper rim shown in isolation in FIG. 9;

FIGS. 12 and 13 are similar views to that of FIG. 10 and each relate respectively to a modified embodiment;

FIG. 14 is a similar view to that of FIG. 1 and relates to a modified embodiment;

FIG. 15 is a similar view to that of FIG. 5, for this modified embodiment;

FIG. 16 is another view similar to that of FIG. 5 and relates to another modified embodiment;

FIG. 17 is a partial view in elevation of this modified embodiment, in the direction of the arrow XVII in FIG. 16;

FIG. 18 is a view in perspective of the anchoring plate used in this modified embodiment;

FIGS. 19 and 20 are views respectively similar to those of FIGS. 16 and 18 and relate to another modified embodiment;

FIG. 21 is a similar view to that of FIG. 5, partly in elevation and partly in section, and relates to another modified embodiment;

FIG. 22 is a partial view in transverse section of this modified embodiment, along the line XXII—XXII in FIG. 21; and FIG. 23 is another view similar to that of FIG. 5 and relates to another modified embodiment.

As illustrated by these figures, a spectacle frame according to the invention comprises in general terms a main structure 10 and, carried by the latter, two surrounds or rims which are each capable of receiving a spectacle lens 11, each of the said surrounds comprising, on the one hand, an upper rim 12 capable of cooperating, by interlocking, with this spectacle lens 11, and, on the other hand, a flexible rim cord 13 capable of being fixed to the main structure 10 at each of its ends, by passing through two holes 14 associated with the main structure.

In the illustrative embodiment shown, the main structure 10 forms overall two arc-shaped curved parts 15, one for each lens 11, joined to one another by means of a central bridge 16, for example with an opening, as shown.

The holes 14 provided for the passage and fixing of the corresponding flexible rim cord 13, by means of a recessed housing 17 in the illustrative embodiment shown, are made at each of the ends of each of the curved parts 15.

At its lateral ends, on the temporal side of these curved parts 15, the main structure 10 carries integral tenons 18, projecting backwards, in the illustrative embodiment shown in FIGS. 1 to 5, the said tenons being suitable for the articulation of side support-pieces 19 in a manner which is in itself known.

If desired, a main structure 10 of this type can advantageously be made of synthetic material in its entirety, for example by molding.

In this case, and as shown in FIG. 1, it can also carry integral noseplates 20, projecting backwards, the said plates being integral with the curved parts 15, on the nose side of these curved parts.

In the embodiments shown in FIGS. 1 to 8, each upper rim 12 has an arched configuration overall, according to the contour of the curved parts 15 of the main structure 10.

In a manner which is in itself known, an upper rim 12 of this type carries, projecting from its internal contour, along at least part of the latter, a flange 22 of which the end part, at least of the transverse section, matches the transverse half-section of the flexible rim cord 13.

Thus, the corresponding lens 11 can advantageously be uniformly hollowed at is periphery with a groove 21 which is capable both of interlocking with this flexible rim cord 13, along the lower portion of this periphery, and of interlocking with the flange 22, along the upper portion of this periphery.

In a manner which is in itself known, and as shown in FIGS. 1 to 5, each upper rim 12 can consist of two pieces, namely, on the one hand, a grooved metal piece 23, and, on the other hand, a strip of synthetic material 24, which is inserted in the grooved piece 23 and the projecting part of which forms the flange 22.

As a modified embodiment, shown in FIG. 6, this flange 22 can form an integral part of the remainder of the upper rim 12, the whole being made of a single piece of metal.

Whatever the case may be, two holes 26 are made at one or both of the ends of an upper rim 12 to match the corresponding holes 14 in the main structure 10, the flange 22 stopping short of this end.

In the embodiments illustrated by FIGS. 1 to 13, these holes 26 are provided at each of the ends of the upper rims 12.

Moreover, interlocking means are provided between each upper rim 12 and the main structure 10.

In the illustrative embodiments shown in the figures, these interlocking means comprise, for each upper rim 12, a groove 27 which is made in the main structure 10 and is suitable for at least partial engagement of this upper rim 12.

The upper rim 12 and the groove 27 of the main structure 10 have complementary transverse sections; for example, this can be a rectangular section, as shown.

Moreover, in the illustrative embodiment shown in the figures, transversely, the depth of a groove 27 in the main structure 10 is at least equal to the height of the upper rims 12, so that, transversely, each of these upper rims 12 is totally covered by the main structure 10.

Furthermore, in the embodiments illustrated by FIGS. 1 to 8, in which each upper rim 12 only has a limited extension, the extension of the curved parts 15 of the main structure 10 is at least equal to that of the said upper rim, so that, longitudinally, each upper rim 12 is also totally covered by the main structure 10.

As a result, once it is in place on the main structure 10, each upper rim 12 is totally invisible from the outside, provided, of course, that this main structure 10 is not transparent.

This positioning of the upper rims 12 on the main structure 10 is carried out by simply locking these upper rims 12 into the grooves 27 in the curved parts 15 of this main structure 10, the holes 26 in this upper rim 12 then corresponding with the holes 14 in the curved parts 15.

In practice, this positioning is carried out in the workshop.

Whatever the case may be, according to the invention, for at least one of the ends of a flexible rim cord 13 and for each of these ends in the embodiments illustrated by FIGS. 1 to 13, four holes are thus provided in the combination, two holes, 14, being formed in the main structure 10 in a manner which is individually in itself known, and two holes, 26, being formed in the upper rim 12 in question, also in a manner which is individually in itself known, the said holes 14 and 26 being in corresponding pairs from the main structure 10 to the said upper rim 12.

In the embodiments illustrated by FIGS. 1 to 13, each end of the flexible rim cord 13 is thus passed initially through a first of the holes 26 in the upper rim 12, and then through a first of the holes 14 in the main structure 10, and subsequently, in the opposite direction, through the second of the holes in the main structure 10 and lastly through the second of the holes 26 in the upper rim 12, before it is finally folded back.

This engagement of this end of a flexible rim cord 13 in these holes is carried out in accordance with the customary procedures in this field.

As regards known arrangements, these will not be described in detail in this text.

It will suffice to specify that this engagement can be carried out in the workshop before the lenses 11 are positioned, the practitioner then reducing each flexible rim cord to a length suitable for the particular contour of these lenses 11 when this positioning takes place.

As a modified embodiment, the engagement can be carried out by this practitioner when this positioning takes place.

Whatever the case may be, and according to the invention, each flexible rim cord 13 fastens the corresponding upper rim 12 to the main structure 10, at one or both of the ends of this upper rim 12 and in practice to each of these ends in the embodiments illustrated by FIGS. 1 to 13.

According to the embodiment illustrated by FIG. 7, instead of possessing a projecting flange on its internal contour, each upper rim 12 has this internal contour hollowed with a bezel 22'.

In this case, the upper portion of the periphery of the corresponding lens 11 must be chamfered for interlocking with the corresponding upper rim 12, and its lower portion must possess a groove 21 for interlocking with the flexible rim cord 13.

According to the modified embodiment illustrated by FIG. 8, the noseplates 20 are carried by the upper rims 12 instead of being carried by the main structure 10.

In this case, a noseplate 20 of this type is articulated, in a manner which is in itself known, at the end of an arm 28 which is joined in a suitable manner, for example by welding, to the corresponding upper rim 12.

Likewise, in this modified embodiment, each upper rim 12 carries the associated tenon 18, the latter being joined, for example, by welding. Corresponding to this tenon 18, the main structure in question then possesses a lateral slot as a continuation of the groove, for the passage and interlocking of this tenon (not shown in the figures).

In the foregoing text, each upper rim 12 only has a limited extension.

As a modified embodiment, shown in FIGS. 9 to 11, it extends approximately in a circle in order to enclose the corresponding lens 11 over the whole periphery of the latter.

As previously, it can simply be engaged in a groove 27 in the main structure 10.

At its external periphery, it is adapted to cooperate, by interlocking, with the associated flexible rim cord 13.

For this purpose, it possesses an external groove 29, shown in FIGS. 9 and 10, which is adapted to the configuration of this flexible rim cord.

In the embodiment illustrated by FIGS. 9 and 10, the internal contour of each upper rim 12 is hollowed with a bezel 22'.

However, as a modified embodiment, it can possess a projecting flange 22, as previously, this flange either being formed by a separate strip 24, shown in FIG. 12, or being in a single piece, shown in FIG. 13, depending on the procedures described above.

Whatever the case may be, in the embodiment shown, this upper part 12 locally possesses, in substantially diametrically opposite positions, two deformations 30 having the approximate shape of a half-wave, each of these deformations being used to form two holes 26 provided for the passage of the corresponding end of the flexible rim cord 13 in question, in cooperation with a third hole 31 formed at the connection between this deformation 30 and the standard part of the upper rim 12.

In this case, in order to receive each of the deformations 30 of an upper rim 12, the groove 27 in the main structure 10, in which the said upper rim is engaged, possesses a corresponding enlargement 33, as shown in FIG. 11.

The positioning of the flexible rim cord 13 is carried out in accordance with procedures described above.

However, before engagement of an end of this flexible rim cord 13 in the corresponding holes 14 and 26 in the main structure 10 and the upper rim 12 in question, this end is engaged from the outside in the third hole 31 in the upper rim 12 which is associated, in this case, with the previous holes.

In the modified embodiments illustrated by FIGS. 14 to 23, corresponding holes both in the main structure 10 and in each of the upper rims 12 are only provided for one of the ends of the corresponding flexible rim cord 13.

In fact, experience shows that this arrangement is adequate, in practice, for the desired fastening of the upper rim to the main structure for good rigidity of the assembly.

For example, and as shown, it is on the nose side that each flexible rim cord 13 is conjointly passed through two holes 14 in the main structure 10 and through two holes 26 in the corresponding upper rim 12.

In the embodiments illustrated by FIGS. 14 to 22, an anchoring plate 35 is provided at the other end of this flexible rim cord 13, on the temporal side, which anchoring plate is separate from the upper rim 12 in question and, with the said flexible rim cord 13 passing through it, cooperates with the main structure 10 for the fixing of the said other end of this flexible rim cord 13.

In practice, this anchoring plate 35 possesses two holes 37 for the passage of the flexible rim cord 13.

For example, as shown in FIGS. 14 and 15, it is arranged on the inside of the main structure 10, that is to say on the same side as the corresponding lens 11, in the groove 27 in the said main structure 10, at right angles to the housing 17 in the latter; it is therefore a continuation of the upper rim 12 in question, the extension of which is limited for this purpose.

In the illustrative embodiment shown, it has a curved profile, the concavity of which is directed towards the lens 11, and the bottom of which bears on the bottom of the groove 27 in the main structure 10.

Its holes 37 approximately correspond with the holes 14 in the main structure 10.

As regards the above embodiments, everything is therefore as if the anchoring plate 35 formed a part detached from the upper rim 12.

However, as distinct from the latter, the anchoring plate can move relative to the main structure 10.

Thus, the assembly is particularly easy to put together, it being possible for the holes 37 in the anchoring plate 35 to be conveniently aligned with the holes 14 in the main structure 10, without having to alter the position of the upper rim 12.

As previously, the flexible rim cord initially passes through a first of the holes 37 in the anchoring plate 35, then successively through the two holes 14 in the main structure 10, and finally through the second of the holes 37 in the anchoring plate 35.

As a modified embodiment, shown in FIGS. 16 to 18, the anchoring plate 35, which in this case is flat, for example, as shown, is arranged on the outside of the main structure 10, that is to say opposite the lens 11, and at right angles to a slot 38 in the said main structure 10, the width of which slot is less than that of the anchoring plate 35.

In the illustrative embodiment shown, the anchoring plate 35 is arranged in the housing 17 which the main structure 10 possesses on the outside, the slot 38 is provided in the bottom 39 of this housing 17, and the latter has a length which is greater than that of the anchoring plate 35, so that, as previously, the said anchoring plate can move relative to the main structure 10, parallel to the slot 38.

Opposite this slot 38, the upper rim 12 possesses two holes 26, as in the embodiments illustrated by FIGS. 1 to 13, for the passage of the appropriate end of the flexible rim cord 13, the said flexible rim cord 13 passing through the slot 38 in the main structure 10 between the holes 37 in the anchoring plate 35 and the holes 26 in the said upper rim 12.

As regards these above embodiments, everything is therefore as if the anchoring plate 35 formed a part detached from the main structure 10, its holes being substituted for those in the latter.

However, as previously, its mobility makes the assembly easier to put together.

Moreover, its presence on the outside of the main structure 10 gives the latter a particularly esthetic appearance.

In the modified embodiments illustrated by FIGS. 19 to 22, in which the main structure 10 is made of synthetic material, this being the preferred case, at least part of the anchoring plate 35 is arranged in the thickness of this main structure 10.

For example, as shown in FIGS. 19 and 20, where the main structure 10 is produced by molding, the anchoring plate is embedded in the thickness of the latter, by duplicate molding, during this actual molding process.

As previously, the anchoring plate is set up at right angles to the corresponding housing 17 in the main structure 10, with its holes 37 corresponding with the holes 14 in this main structure.

To ensure its anchoring in the bulk of the latter, the anchoring plate possesses lateral notches 40.

As a modified embodiment, shown in FIGS. 21 and 22, the anchoring plate 35 is on the surface of the main structure 10; it forms part of the baseplate 42 of an insert 43 which carries the corresponding knuckle 18 in a single piece, in a manner which is in itself known.

Its holes 37 are protruded at right angles to recesses in the main structure 10, which, emerging on the inside, are suitable for the passage of the flexible rim cord (recesses not visible in the figures).

In the embodiment illustrated by FIG. 23, the main structure 10 possesses, for example on the temporal side, as shown, three approximately parallel holes 14 for receiving the corresponding end of the flexible rim cord 13, and the said end passes through these holes to form a double loop having an approximately S-shaped profile, which, by means of a baffle effect, ensures more reliable blocking than a simple loop, in particular if the main structure 10 is made of synthetic material.

Preferably, and as shown, on the outside, opposite the lens 11, two of these holes emerge externally in a common housing 17, which makes it possible for the flexible rim cord 13 not to project outwards between these holes 14, and the third hole emerges directly on the outer surface of the main structure 10, which makes it possible to cut off the free end of the flexible rim cord 13, level with the main structure.

Of course, the present invention is not limited to the embodiments which have been described and shown, but encompasses any modified procedure and/or modified combination of their various elements; in particular, the two upper rims can, if desired, be joined to one another by means of one or more bridges, in which case the main structure can be made of two pieces, each individually formed from one of its curved parts.

Moreover, as will be understood, each upper rim 12, or, if appropriate, each of the constituent parts of the latter, can advantageously be formed from a length of extruded section, which is cut as required and bent to the desired configuration; it is for this reason that, in FIGS. 9 to 13, the groove 21 in this upper rim extends not only over the lower portion of this upper rim, where it cooperates with the flexible rim cord 13 in question, but also over its upper portion, where, in this case, it has no function in practice.

As a modified embodiment, in this upper portion, the upper rim can cooperate, by interlocking, with a flange provided for this purpose, which projects from the main structure, the latter therefore no longer necessarily possessing a groove 27.

Whatever the case may be, for the reasons explained above, each upper rim 12, or, if appropriate, at least the grooved part 23 of the latter, is preferably made of metal.

However, a synthetic material can also be used if this synthetic material is chosen to possess all the desirable ridigity.

As regards the main structure 10, it is preferably made of synthetic material, as mentioned with reference to the embodiments illustrated by FIGS. 21, 22 and 23, and this synthetic material is preferably chosen to possess a certain flexibility.

However, as a modified embodiment, the main structure can also be made of metal or light alloy, if desired.

I claim:

1. Spectacle frame of the kind comprising a main structure and, carried by the latter, two surrounds or rims which are suitable for receiving a spectacle lens, each of the said surrounds or rims comprising, on the one hand, an upper rim suitable for cooperating, by interlocking, with a spectacle lens, and, on the other hand, a flexible rim cord suitable for being fixed to the main structure at each of its ends, by passing through two holes associated with the said main structure, characterized in that, for at least one of the ends of the flexible rim cord, four holes are provided in combination, two holes being formed in the main structure, and two holes being formed in the upper rim in question, the said holes being in corresponding pairs from the said main structure to the said upper rim, so that the said flexible rim cord fastens the upper rim to the main structure.

2. Spectacle frame according to claim 1, characterized in that there are two holes in the main structure and two holes in the upper rim for each end of the flexible rim cord.

3. Spectacle frame according to claim 2, in which each upper rim extends approximately in a circle, characterized in that this upper rim locally possesses, in substantially diametrically opposite positions, two deformations having the approximate shape of a half-wave, each of these deformations being used to form the two holes provided for the passage of the corresponding end of the flexible rim cord in question, in cooperation with a third hole formed at the connection between this deformation and the standard part of this upper rim.

4. Spectacle frame according to claim 1, characterized in that an anchoring plate is provided at the other end of the flexible rim cord, which anchoring plate is separate from the upper rim and, with the flexible rim cord passing through it, cooperates with the main structure for the fixing of the said other end of the said flexible rim cord.

5. Spectacle frame according to claim 4, characterized in that the said anchoring plate possesses two holes for the passage of the flexible rim cord.

6. Spectacle frame according to claim 5, characterized in that the anchoring plate is arranged on the inside of the main structure, as a continuation of the upper rim, and its holes approximately coincide with the holes in the said main structure.

7. Spectacle frame according to claim 6, characterized in that the anchoring plate possesses a curved profile and its concavity is directed towards the spectacle lens.

8. Spectacle frame according to claim 4, characterized in that the anchoring plate is arranged on the outside of the main structure, at right angles to a slot in the latter, the width of the said slot being less than that of the anchoring plate, the upper rim possesses two holes opposite the said slot, and the flexible rim cord passes through the latter between the holes in the anchoring plate and the holes in the upper rim.

9. Spectacle frame according to either one of claims 6 or 8, characterized in that the anchoring plate can move relative to the main structure.

10. Spectacle frame according to claim 5, characterized in that at least part of the anchoring plate is arranged in the thickness of the main structure.

11. Spectacle frame according to claim 10, characterized in that the anchoring plate is embedded in the thickness of the main structure.

12. Spectacle frame according to claim 10, characterized in that the anchoring plate forms part of the baseplate of an insert which carries a knuckle.

13. Spectacle frame according to claim 1, characterized in that, at the other end of the flexible rim cord, the main structure possesses three approximately parallel holes for receiving the said other end of the flexible rim cord, and this end forms a loop having an approximately S-shaped profile.

14. Spectacle frame according to claim 13, in which, on the outside, opposite the spectacle lens, two of the holes in the main structure emerge, on the outside, in a common recessed housing, characterized in that the third hole in the said main structure emerges directly on the outer surface of the latter, which makes it possible to cut off the end of the flexible rim cord, level with the main structure.

15. Spectacle frame according to claim 1, in which interlocking means are provided between each upper rim and the main structure, characterized in that the said interlocking means comprise a groove made in the main structure for at least partial engagement of the upper rim.

16. Spectacle frame according to claim 15, characterized in that, transversely, each upper rim is totally covered by the main structure.

17. Spectacle frame according to claim 16, in which each upper rim only has a limited extension, characterized in that, longitudinally, this upper rim is also totally covered by the main structure.

18. Spectacle frame according to claim 1, having a so-called combined composition whereby it is partly made of metal and partly made of synthetic material, characterized in that it is the main structure which is made of synthetic material, whilst the upper rims are made of metal.

* * * * *